Sept. 1, 1953 T. E. GARDNER 2,651,030
LINE FAULT SIGNAL DEVICE
Filed Aug. 31, 1951 2 Sheets-Sheet 1

INVENTOR
THOMAS E. GARDNER
BY Jones and Young
AGENTS

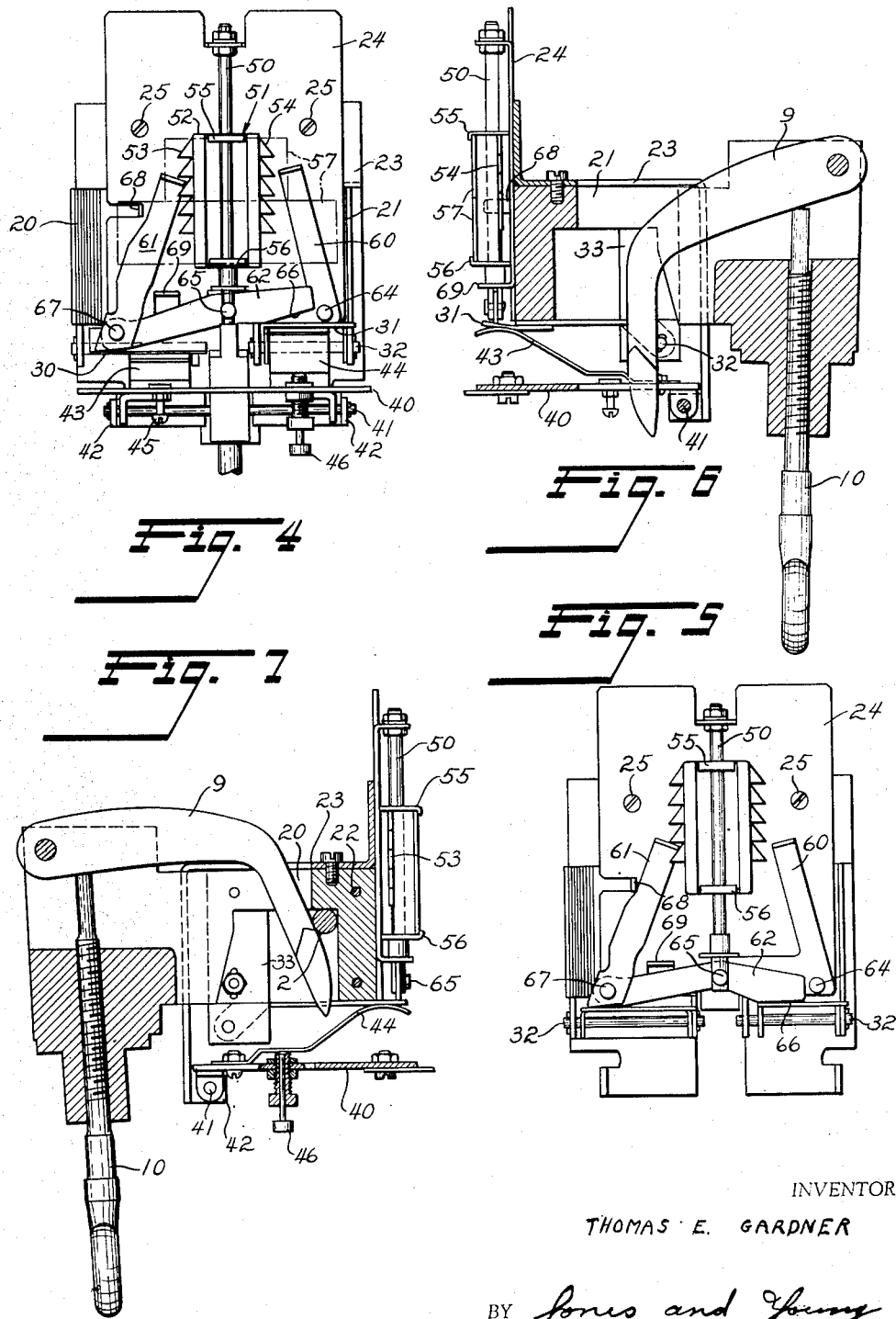

Patented Sept. 1, 1953

2,651,030

UNITED STATES PATENT OFFICE 2,651,030

LINE FAULT SIGNAL DEVICE

Thomas E. Gardner, Raleigh, N. C.

Application August 31, 1951, Serial No. 244,670

10 Claims. (Cl. 340—253)

The present invention relates generally to an electromechanical signal device and more particularly to an electrical line fault signal device.

In the distribution of electrical current, power lines are continually subjected to a wide variety of events which momentarily or permanently result in a fault condition on the distribution lines. When trouble of this nature occurs, the main switch for the entire group of power lines between the substations in which the line fault occurs, is thrown out of operation. It is extremely difficult to ascertain the exact point at which the trouble occurs due to the wide spacing apart of the substations and also the innumerable power lines present in a conventional distribution system. The present method employed to locate the fault is to either employ a serviceman who, by trial and error, will attempt to trace the distribution or transmission system and endeavor to locate and isolate the point at which the fault occurred.

There have been some devices heretofore employed which have been applied to the lines in an effort to narrow down the area in which the trouble may be present. However, such devices have not been entirely satisfactory since they have necessitated the placing of indicators on the line by the serviceman, calling in to the substation to restore the power to see if the current is properly passing up to that point. If the current is passing properly up to that point, the device so signifies and the serviceman removes the signal device and repeats the operation further along the power distribution system. Each test requires manual resetting of the device. Obviously, this operation is unfeasible since it is time consuming and subjects the serviceman to considerable danger on high tension lines.

It is, therefore, a principal object of the present invention to provide a line fault signal device with very simple construction which will be permanently affixed at spaced points throughout the power system to permit a serviceman to locate the specific area in which the trouble lies, in a relatively short time.

Another object is to provide a line fault signal device which will automatically re-set itself to a normal position upon the correction of the trouble.

Still another object is to provide a line fault signal device which will stepwise progressively indicate that the fault is permanent after the several checks ordinarily employed in this operation.

Still a further object is to provide a line fault signal device which is very compact in structure and operates under all weather conditions.

Briefly in accordance with this invention there is provided an electromechanical assembly including a magnetic core having a pair of adjustable air gap armatures which core may be mounted upon an electrical conductor to straddle the conductor and form a closed magnetic path through one armature in response to normal conductor current and through the other armature in response to conductor overcurrent respectively. The armatures coact with corresponding lever mechanisms to move a normally invisible signal indicator into visible position in response to conductor overcurrent and to automatically restore the signal indicator to invisible position in response to normal conductor current. One of the levers cooperates with one of the armatures to retain the signal indicator in visible position after an overcurrent in response to less than or no conductor current thereby enabling successive overcurrent checks which progressively increase the visible overcurrent signal indication. Adjustable means are provided for securing the assembly on the conductor and the assembly is enclosed in a suitable protective casing having a window adjacent the moveable signal indicator which is normally masked from view behind the casing during normal conductor current.

Fig. 4 is a front elevation of the line fault signal assembly of Fig. 3 with the protective casing removed;

Fig. 5 is a front elevation of the line fault signal device shown in Fig. 2 with the protective casing removed and the indicator member in raised position;

Fig. 6 is a side elevation, partly in cross-section of the line fault signal device, shown in Fig. 4; and Fig. 7 is a view similar to that shown in Fig. 6 illustrating the manner of attaching the signal device to a power line.

Figure 1:
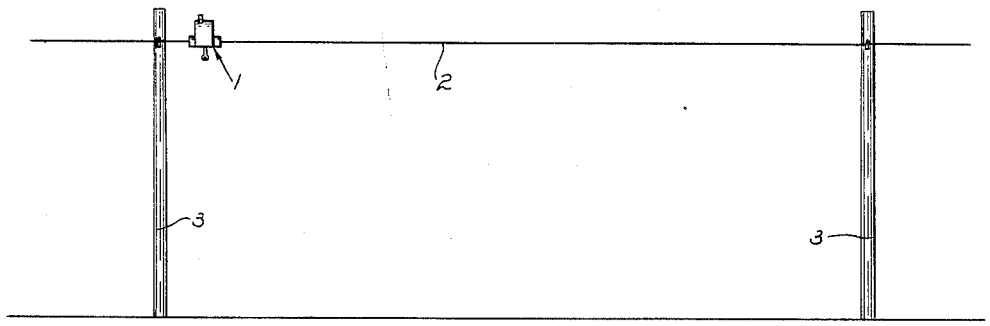
Fig. 1 is a side view showing a plurality of line fault signal devices made in accordance with the present invention installed at spaced intervals on a conventional power line.
Figure 2:
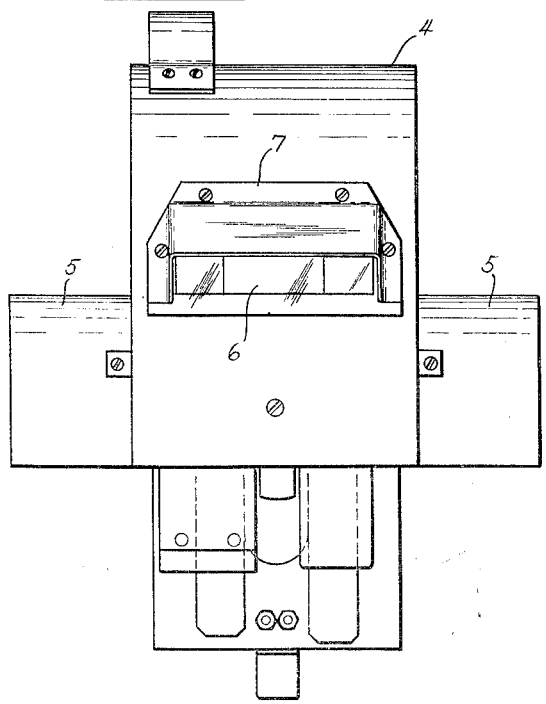
Fig. 2 is a front elevation of a line fault signal device made in accordance with the present invention.
Figure 3:
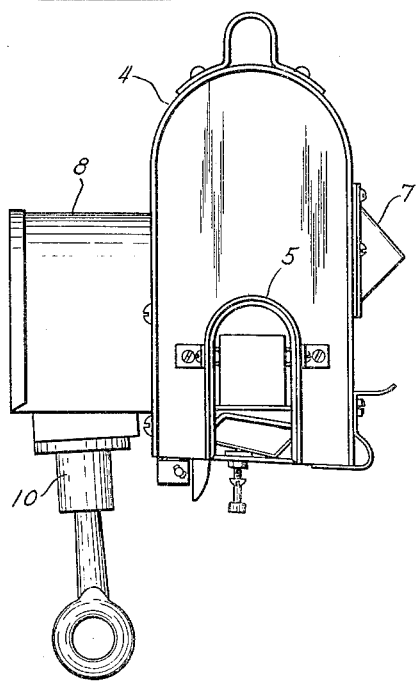
Fig. 3 is a side elevation of the line fault signal device shown in Fig. 2.

Referring now to Figs. 2 and 3, there is shown the line fault signal assembly enclosed in a protective casing 4. The casing 4 is provided with protective channels 5 extending from each side which are in the shape of a yoke open at the bottom to receive and straddle an electrical conductor 2 as best shown in Fig. 1. These protective side yoke extensions serve to protect the assembly on the conductor. An opening is provided in the front face thereof with a transparent window 6 having a protective shield 7 which is open at an angle near the bottom to enable line of sight observation of the transparent window 6 from a position below the signal device when mounted on a power line. The side view in Fig. 3 shows an extension 8 of the casing 4 which protects the adjustable means 9 for securing the signal assembly on the line or conductor as will hereinafter be more fully described. It is noted that this portion of the casing is open at the base to allow external access to the adjusting handle 10 of the securing means 9. The electromechanical assembly which is enclosed in the protective casing 4 illustrated in Figs. 2 and 3 will be hereinafter more fully described in connection with Figs. 4 through 7 which illustrate the assembly with the protective casing 4 removed.

Referring now to Figs. 4 through 7, where like numerals designate like parts, there is shown an electromechanical structure including a pair of yoke-shaped magnetic cores 20 and 21, which may be preferably made up of a stack of E-shaped laminations in surmounting relation. The laminations may be held together by any suitable means such as nuts and bolts or rivets as diagrammatically shown at 22 in Fig. 7. Each of the magnetic cores 20 and 21 is provided with a cooperating armature 30 and 31 respectively. The armatures 30 and 31 are pivotally hinged on a pin 32 which extends through extensions in the end lamination 33 in one leg of the yoke-shaped magnet cores.

The magnet cores 20 and 21 are secured together in side by side aligned relation with an intermediate space adapted to receive the adjustable securing means shown generally at 9 in Figs. 6 and 7. A plate 23 extends across the top or intermediate portion of the magnetic cores and down adjacent the external face of one leg of the cores. Another plate 24 extends upwardly adjacent the external face of the other legs of the magnetic cores and is secured to an upturned flange on the plate 23 by suitable screws 25. The plate 24 carries the signal indicator and cooperating mechanical movement to be hereinafter more fully described. The portion of the plate 23 adjacent to the corresponding external face and extending below the magnet cores carries another plate 40 pivotally mounted on pin 41 extending through ears 42 on extended portion of the plate 23. The plate 40 is adapted to underlie the armatures 30 and 31 and carries resilient members 43 and 44 secured at one end to the plate 40 and having their free end bear against the corresponding armatures to maintain a predetermined armature air gap. The plate 40 also carries screws 45 and 46 which are adapted to bear against the under surface of the resilient members 43 and 44 respectively. These screws may be adjusted to vary each of the armature air gaps respectively in accordance with the magnetic tractive force desired which corresponds to the magnitude of line-fault current to be controlled.

The plate 24 carries a vertical post 50 upon which is slidably mounted a signal carrier 51. The carrier comprises a plate 52 having opposing saw tooth ratchet surfaces 53 and 54 along each edge parallel to the post 50. The plate 52 is mounted on the post 50 by means of ears 55 and 56 which are secured to the top and bottom edges of the plate 52 and which have suitable aligned openings adapted to receive the post 50. Each of the ears 55 and 56 have turned over edges spaced from the plate 52 which are adapted to receive and retain therebetween a signal indicator card 57. The card 57 is preferably divided into an upper and lower portion of different colors which for the purposes of this invention may be exemplarily described as green in the upper portion and red in the lower portion. It is noted that the signal carrier 51 is freely slidable on the post 50 and will normally occupy a position at the lower end of the post 50. When in this position the colored signal indicator card 57 is not visible through the transparent casing window 6 but becomes increasingly visible as it moves upwardly along the post 50.

A suitable mechanism is provided to progressively move the signal indicator upward along the post 50 in response to successive overcurrents in the conductor 2 and to automatically restore the signal indicator to invisible position in response to a normal current condition. This mechanism includes a plurality of levers 60, 61 and 62. The integral lever 60 is in the form of an angle pivotally connected at its apex 64 to the plate 24 so that one leg surmounts the free end of the armature 31 which extends beyond the core leg and plate 24. The other leg of the lever 60 extends upwardly at an angle towards the ratchet edge 54 on the indicator plate 52. The lever 62 is pivotally connected at 65 intermediate its ends at the base of the post 50. One end of the lever 62 has a depending cam surface 66 which surmounts the free extending end of the armature 31. The other end of the lever 62 surmounts the free extending end of the armature 30 and has pivotally connected thereto at 67 one end of the lever arm 61. The other end of the lever arm 61 extends upwardly at an angle towards the ratchet edge 53 of the signal carrier plate 52. The pivotally connected levers 61 and 62 provide a compound crank which progressively moves the signal carrier 51 upwardly along the post 50 when the pivotally connected ends are engaged and forced upward by the tractive closing force of the armature 30 in response to magnetic flux traverse due to a conductor overcurrent. Suitable limiting stops in the form of outwardly extending ears 68 and 69 on the plate 24 are provided to limit movement of the levers 61 and 62 respectively. The upper leg of the integral lever 60 is swung away from the carrier 51 about the pin 64 when the lower leg is engaged and forced upward by the tractive closing force of the armature 31 in response to normal or greater than normal conductor current. The upper leg of this lever 60 is swung toward engagement with the ratchet edge 54 of the carrier 51 when the free end of the armature 31 is released from positive engagement with the lower leg of the lever 60 in response to no conductor current or when forced from engagement by the depending cam surface 66 of the lever 62 in response to conductor overcurrent.

In operation the line-fault signal device is mounted upon the electrical power line at spaced intervals as best shown in Fig. 1. The mounting arrangement is such that the line conductor passes through the yoke-shaped magnetic cores 20 and 21 which straddle the conductor so that the weight of the entire assembly rests directly on the conductor at the inner surface of the core yoke. The assembly is secured in this position by tightening the hand screw 10 which bears against the rocker arm 9 a suitable distance away from the rocker arm pivot which is fixedly supported by the core assembly. The leverage of the hand screw 10 bearing against the rocker arm 9 swings the rocker arm about its pivot in a direction to bring its free end to bear against the periphery of the conductor 2 opposite the inner surface of the yoke-shaped cores. This action results in locking the conductor 2 in fixed position between the rocker arm 9 and the inside or yoke surface of the magnet cores 20 and 21, as best illustrated in Fig. 7. The hand screw 10 is also provided with an externally accessible open eye at the end which is designed to receive a suitable adjusting tool independently operated from below.

During normal current conditions in the conductor, the air gaps of armatures 30 and 31 are adjusted so that the armature 31 is magnetically attracted against the corresponding magnet core 20 21 to close its magnetic path about the conductor and by virtue of the magnetic tractive force engages and swings the lever 60 out of engagement with the indicator carrier ratchet edge 54. At the same time the air gap of the armature 30 is such that the magnetic field resulting from normal conductor current is inadequate to attract the armature 30 to the corresponding magnet core 20. Accordingly the free end of the lever 61 remains out of engagement with the indicator carrier ratchet edge 53 and the depending cam surface 66 on lever 62 does not engage the armature 31. As a result, during the condition of normal conductor current the signal carrier 51 remains at the low end of the post 50 and only the upper or green portion of the signal indicator card 57 is visible through the transparent window 6. Thus, a visible green signal is an indication of normal line or conductor current. The respective air gaps may be adjusted for any desired line current as hereinbefore described.

In the event of a line fault which may be manifested in the form of a conductor overcurrent, the resultant magnetic flux traversing the cores 20 and 21 is increased sufficiently to overcome the air gap of the armature 30 causing it to swing upwardly toward the core 20 to close the corresponding magnetic path. Concurrently with this action, the free extended end of the armature 30 engages the pivotally connected ends of levers 61 and 62 causing these ends to swing upwardly about the pivot 65 towards the carrier ratchet edge 53. As a result, the free end of the lever 61 engages one of the ratchet teeth and moves the signal carrier 51 upwardly along the post 50. At the same time the free end of the lever 62 swings downwardly about the pivot 65 so that the depending cam surface 66 engages and forces the free end of the armature 31 away from closed magnetic contact with its corresponding core 21. This action results in the lever 60 swinging inwardly about its pivot so that the upper leg is free to engage one of the teeth of the carrier ratchet edge 54. If the current through the conductor is sufficiently reduced below normal or cut off with the mechanism in this condition, the armatures 30 and 31 are both free to drop away from closed magnetic relation with their corresponding armatures and are limited in their movement only by the resilient members 43 and 44. This action allows the pivotal connection of the levers 61 and 62 to drop away from the signal carrier 51 about the pivot 65 and releases the ratchet edge 53 from engagement with the free end of the lever 61. The signal carrier 51 is retained in its lifted position and prevented from dropping by virtue of engagement of the carrier ratchet edge 54 with the upper leg of the lever 60.

The foregoing mechanical actions of the lever mechanism may be successively repeated several times by reinstating the conductor overcurrent to provide a plural check on the overcurrent condition. The signal carrier 51 is progressively raised along the post 50 in response to such successive overcurrent excitations and the progression is limited only by the space between the top of the signal carrier 51 and the upper terminal of the post 50 and the number of teeth on the ratchet edges 53 and 54. Each time the signal indicator is lifted upwardly along the post 50 by action of the lever mechanism in response to overcurrent excitations of the electromagnets, a greater area of the red portion of the signal indicator card 57 becomes visible through the transparent window 6 in the protective casing 4. In the embodiment illustrated in Figs. 4–7, the successive check may be made three or more times for a maximum visual overcurrent signal.

Thus, in accordance with the preferred embodiment of this invention, when a line fault occurs on a transmission line including a conductor having one or more line fault signal devices mounted thereon, it is a relatively simple matter to isolate and locate the position of the fault by visually inspecting the spaced indicators for a red signal. Moreover, with the present invention no further tests are required thus eliminating any possibility of increased damage to the conductors as well as the other equipment. Moreover, the operation of related systems leading from the substation will not be disrupted resulting in a monetary savings as well as eliminating the innumerable complaints that would occur. Similarly, by employing the prefered embodiment of this invention, the fault will be located during normal test by the operation of the automatic reclosing device of the instrument. Thus the repairman can secure a complete clearance of the line in fault before going out to repair such fault. This eliminates any possible bodily harm to a repairman by working on a line that might still be in operation.

Once the line fault has been isolated in accordance with this invention and corrected, power may be reapplied to the transmission line to restore normal conductor current. As previously described, the armatures 30 and 31 will react to such normal current condition so that the armature 30 is not attracted to the core 20 while the armature 31, by virtue of its lesser air gap, is attracted and closes the corresponding magnetic path through the core 21. As a result of this action, levers 61 and 62 which are not acted upon by the armature 30, remain out of engagement with the carrier ratchet edge 53, while the lever 60 is swung about its pivot out of engagement with the carrier ratchet edge 54, allowing the signal carrier 51 to drop from its former overcurrent position along the post 50 to its lowest position thereon, which results in the red portion of the signal indicator card 51 again becoming invisible and only the green portion remaining visible through the transparent window 6. This action accomplishes an automatic resetting of the line fault signal device and puts the mechanism in condition for visual indication of future line faults without requiring the assistance of an external agent, thereby eliminating manual resetting of the mechanism.

I have shown and described what I consider the preferred embodiment of my invention along with suggested modified forms, and it will be

I claim:

1. An electromechanical line-fault signal device comprising in combination, means for securing the device on an electrical conductor, a magnetic core and cooperating armature adapted to straddle and form a closed magnetic path about the conductor in response to a conductor overcurrent, a normally invisible movable indicator, means cooperating with said armature to move the indicator into visible position in response to a conductor overcurrent, and means operably associated therewith for automatically returning the indicator to invisible position during conductor current.

2. An electromechanical line-fault signal device comprising in combination, means for securing the device on an electrical conductor, a yoke-shaped magnetic core adapted to straddle the conductor and having a cooperating armature pivotally connected at one end adjacent the core open yoke end, said core and armature adapted to form a closed magnetic path about the conductor in response to a conductor overcurrent, a normally invisible movable indicator supported adjacent the free end of the armature, lever means operably supported adjacent the free end of said armature and coacting therewith to move the indicator into visible position in response to a conductor overcurrent, and means operably associated therewith for automatically returning the indicator to invisible position during normal conductor current.

3. An electromechanical line-fault signal device comprising in combination, means for securing the device on an electrical conductor, a pair of aligned yoke-shaped magnetic cores adapted to straddle the conductor and each having a cooperating armature pivotally connected at one end adjacent the core open yoke end, one of said cores and cooperating armatures adapted to form a closed magnetic path about the conductor in response to normal conductor current and the other core and armature adapted to form a closed magnetic path about the conductor only in response to a conductor overcurrent, a normally invisible movable indicator supported adjacent the free ends of said armatures, a first lever means operably supported adjacent the free end of said overcurrent responsive armature for cooperation therewith to move the indicator into visible position in response to a conductor overcurrent, a second lever means operably supported adjacent the free end of said normal current responsive armature for cooperation therewith to automatically release the indicator from visible position and thereby allow the indicator to return to invisible position during normal conductor current.

4. An electromechanical line-fault signal device comprising in combination, means for securing the device on an electrical conductor, a magnetic core and cooperating armature adapted to straddle and form a closed magnetic path about the conductor in response to a conductor overcurrent, a normally invisible movable indicator, means cooperating with said armature to move the indicator into visible position in response to a conductor overcurrent, means cooperating therewith for retaining the indicator in visible position during less than normal current after a conductor overcurrent, and other means operably associated therewith for automatically returning the indicator to invisible position during normal conductor current.

5. An electromechanical line-fault signal device comprising in combination, means for securing the device on an electrical conductor, a pair of aligned yoke-shaped magnetic cores adapted to straddle the conductor and each having a cooperating armature pivotally connected at one end adjacent the core open yoke end, one of said cores and cooperating armatures adapted to form a closed magnetic path about the conductor in response to normal conductor current and the other core and armature adapted to form a closed magnetic path about the conductor only in response to a conductor overcurrent, a normally invisible movable indicator supported adjacent the free ends of said armatures, cooperating lever means operably supported intermediate the indicator and the free ends of said armatures, said lever means coacting with the free end of said overcurrent responsive armature to move the indicator into visible position in response to a conductor overcurrent, said lever means cooperating to retain the indicator in visible position during less than normal conductor current after a conductor overcurrent, and said lever means coacting with the free end of said normal current responsive armature to automatically return the indicator to invisible position during normal conductor current.

6. An electromechanical line-fault signal device comprising in combination, means for securing the device on an electrical conductor, a pair of aligned yoke-shaped magnetic cores adapted to straddle the conductor and each having a cooperating armature pivotally connected at one end adjacent the core open yoke end, one of said cores and cooperating armatures having an airgap therebetween adjusted to form a closed magnetic path about the conductor in response to normal conductor current and the other core and armature having an airgap therebetween adjusted to form a closed magnetic path about the conductor only in response to a conductor overcurrent, a normally invisible movable indicator supported adjacent the free ends of said armatures, a first lever means operably supported adjacent the free end of said overcurrent responsive armature for coaction therewith to move the indicator into visible position in response to a conductor overcurrent, a second lever means operably supported adjacent the free end of said normal current responsive armature for coaction therewith to automatically release the indicator to invisible position during normal conductor current, said second lever means arranged to automatically retain the indicator in visible position during less than normal current after a conductor overcurrent.

7. An electromechanical line-fault signal device comprising in combination, means for securing the device on an electrical conductor, a pair of aligned yoke-shaped magnetic cores adapted to straddle the conductor and each having a cooperating armature pivotally connected at one end adjacent the core open yoke end, one of said cores and cooperating armatures having an airgap therebetween adjusted to form a closed magnetic path about the conductor in response to normal conductor current and the other core and armature having an airgap therebetween adjusted to form a closed magnetic path about the conductor only in response to a conductor overcurrent, a normally invisible movable indicator supported adjacent the free ends of said armatures, integral lever means having a pair of legs at an angle pivotally supported at their apex intermediate the indicator and the free end of said normal current responsive armature, one leg of said integral lever adapted to normally engage and hold the indicator in position and the other leg adapted to coact with the free end of said normal current responsive armature to swing the lever about the pivot out of engagement with the indicator in response to normal current, a compound lever comprising a first member pivotally supported intermediate its ends between the free ends of the armatures and a second member having one end pivotally connected to one end of the first member adjacent the free end of said overcurrent responsive armature for coaction therewith and having the other end extending toward engagement with the indicator to move the indicator into visible position in response to a conductor overcurrent, the other end of said first member having a depending cam surface surmounting the free end of said normal current responsive armature for coaction therewith to move the free end of said armature away from positive coaction with the other leg of said integral lever, thereby allowing said integral lever to swing about its pivot into engagement with the indicator during conductor overcurrent.

8. An electromechanical line-fault signal device comprising in combination, means for securing the device on an electrical conductor, a protective casing enclosing the device and having a transparent window, a magnetic core and cooperating armature adapted to straddle and form a closed magnetic path about the conductor in response to a conductor overcurrent, a normally invisible indicator, means cooperating with said armature to move the indicator into visible position adjacent the casing window in response to a conductor overcurrent, and means operably associated therewith for automatically returning the indicator to invisible position during normal conductor current.

9. An electromechanical line-fault signal device comprising in combination, means for securing the device on an electrical conductor, a protective casing enclosing the device and having a transparent window, a magnetic core and cooperating armature adapted to straddle and form a closed magnetic path about the conductor in response to a conductor overcurrent, a normally invisible movable indicator, means coacting with said armature to move the indicator into visible position adjacent the casing window in response to conductor overcurrent, means cooperating therewith for retaining the indicator in visible position during less than normal current after conductor overcurrent, and other means operably associated therewith for automatically returning the indicator to invisible position during normal conductor current.

10. An electromechanical line-fault signal device comprising in combination, adjustable means for securing the device on an electrical conductor, a protective casing enclosing the device and having a transparent window, a pair of aligned yoke-shaped magnetic cores adapted to straddle the conductor and each having a cooperating armature pivotally connected at one end adjacent the core open yoke end, one of said cores and cooperating armatures having an adjustable airgap therebetween adjusted to form a closed magnetic path about the conductor in response to normal conductor current and the other core and armature having an adjustable airgap therebetween adjusted to form a closed magnetic path about the conductor only in response to a conductor overcurrent, a normally invisible movable indicator supported adjacent the free ends of said armatures, integral lever means having a pair of legs at an angle pivotally supported at their apex intermediate the indicator and the free end of the normal current responsive armature, one leg of said integral lever adapted to normally engage and hold the indicator in position and the other leg adapted to coact with the free end of said normal current responsive armature to swing the lever about the pivot out of engagement with the indicator in response to normal current, a compound lever comprising a first member pivotally supported intermediate its ends between the free ends of the armatures and a second member having one end pivotally connected to one end of the first member adjacent the free end of said overcurrent responsive armature for coaction therewith and having the other end extending toward engagement with the indicator to move the indicator into visible position adjacent the casing window in response to a conductor overcurrent, the other end of said first member having a depending cam surface surmounting the free end of said normal current responsive armature for coaction therewith to move the free end of said armature away from positive coaction with the other leg of said integral lever, thereby allowing said integral lever to swing about its pivot into engagement with the indicator during conductor overcurrent.

THOMAS E. GARDNER.

References Cited in the file of this patent

UNITED STATES PATENTS

| Number | Name | Date |
| --- | --- | --- |
| 1,162,899 | Beane | Dec. 7, 1915 |
| 1,521,144 | Adair, Jr. | Dec. 30, 1924 |
| 2,013,241 | Hefner | Sept. 3, 1935 |
| 2,138,430 | Rudd | Nov. 29, 1938 |
| 2,447,625 | Astin | Aug. 24, 1948 |